United States Patent [19]

Tsujita

[11] Patent Number: 6,049,708
[45] Date of Patent: Apr. 11, 2000

[54] MOBILE COMMUNICATION APPARATUS FOR INTERMITTENTLY RECEIVING A BROADCASTING SIGNAL AT A CORRECTED RECEPTION TIMING

[75] Inventor: Shigeru Tsujita, Kanagawa, Japan

[73] Assignee: NEC Corporation, Tokyo, Japan

[21] Appl. No.: 09/013,226

[22] Filed: Jan. 26, 1998

[30] Foreign Application Priority Data

Jan. 24, 1997 [JP] Japan .................................... 9-011071

[51] Int. Cl.⁷ .............................. H04B 1/16; H03L 1/00
[52] U.S. Cl. ..................... 455/334; 455/259; 455/182.3; 455/192.3; 331/176; 375/344
[58] Field of Search ................... 455/343, 38.3, 455/226.1, 67.1, 255, 256, 257, 258, 259, 260, 182.1, 182.2, 182.3, 192.1, 192.2, 192.3, 334; 375/344, 343; 331/176

[56] References Cited

U.S. PATENT DOCUMENTS

| | | | |
|---|---|---|---|
| 4,427,302 | 1/1984 | Watanabe | 368/200 |
| 4,611,181 | 9/1986 | Fukumura et al. | 331/66 |
| 5,117,504 | 5/1992 | Dennerlein et al. | 455/67.1 |
| 5,162,758 | 11/1992 | Onishi | 331/176 |
| 5,499,393 | 3/1996 | Fukui | 455/264 |
| 5,719,782 | 2/1998 | Mitsuoka | 702/75 |
| 5,801,594 | 9/1998 | Muto et al. | 331/158 |
| 5,848,355 | 12/1998 | Rasor | 455/260 |
| 5,943,613 | 8/1999 | Wendelrup et al. | 455/343 |

FOREIGN PATENT DOCUMENTS

| | | |
|---|---|---|
| 2-177704 | 7/1990 | Japan . |
| 3-55923 | 3/1991 | Japan . |
| 5-252093 | 9/1993 | Japan . |
| 8-46544 | 2/1996 | Japan . |
| 8-274707 | 10/1996 | Japan . |
| 9-270638 | 10/1997 | Japan . |
| 9-326752 | 12/1997 | Japan . |
| 2132042 | 12/1982 | United Kingdom .............. H03L 7/14 |

*Primary Examiner*—Nguyen Vo
*Assistant Examiner*—Charles N. Appiah
*Attorney, Agent, or Firm*—Sughrue, Mion, Zinn, Macpeak & Seas, PLLC

[57] ABSTRACT

In an apparatus for intermittently receiving a broadcasting signal at a reception timing which appears by a predetermined intermittent reception cycle and is determined by using a clock generator (5) for generating a clock signal of a clock frequency liable to vary due to an environment temperature, a first section (309) determines a maximum count by multiplying the predetermined intermittent reception cycle by the clock frequency at a particular time instant. Given the maximum count at the particular time instant, a second section (308) repeatedly carries out a counting operation of counting up a count to the maximum count in response to the clock signal to produce, when the count is equal to the maximum count, a coincidence signal specifying the reception timing. A third section (310) is for measuring the temperature at the particular time instant as a measured temperature to determine a monitor temperature zone corresponding to the measured temperature and for monitoring, as a subsequent measured temperature, the environment temperature after the particular time instant to produce a correction instruction signal when the subsequent measured temperature is out of the monitor temperature zone. At a correction time instant when the third section (310) produces the correction instruction signal, the first section (309) determines a corrected maximum count and give the corrected maximum count to the second section (308).

7 Claims, 11 Drawing Sheets

| TEMPERATURE ZONE INCLUDING MEASURED TEMPERATURE F | COUNT SET VALUE | MONITOR TEMPERATURE ZONE | | |
|---|---|---|---|---|
| | | Dmin(T) | Dmax(T) | |
| T(−5) < T < T(−4) | C(0) − 4 | T(−5) | T(−3) | ① |
| T(−4) < T < T(−3) | C(0) − 3 | T(−4) | T(−2) | ② |
| T(−3) < T < T(−2) | C(0) − 2 | T(−3) | T(−1) | ③ |
| T(−2) < T < T(−1) | C(0) − 1 | T(−2) | T(0) | ④ |
| T(−1) < T < T(+1) | C(0) | T(−1) | T(+1) | ⑤ |
| T(+1) < T < T(+2) | C(0) − 1 | T(0) | T(+2) | ⑥ |
| T(+2) < T < T(+3) | C(0) − 2 | T(+1) | T(+3) | ⑦ |
| T(+3) < T < T(+4) | C(0) − 3 | T(+2) | T(+4) | ⑧ |
| T(+4) < T < T(+5) | C(0) − 4 | T(+3) | T(+5) | ⑨ |

FIG. 12 though 6,049,708

MOBILE COMMUNICATION APPARATUS FOR INTERMITTENTLY RECEIVING A BROADCASTING SIGNAL AT A CORRECTED RECEPTION TIMING

BACKGROUND OF THE INVENTION

This invention relates to a mobile communication apparatus for intermittently receiving a broadcasting signal at a reception timing which appears by a predetermined intermittent reception cycle.

For a standby period before occurrence of call reception or call origination (or call transmission) in a mobile communication apparatus (particularly in a mobile communication terminal) a broadcasting signal from a base station is intermittently received to save power consumption of a power supply battery. As is known in the art, the broadcasting signal includes control information of, for example, location registration control information. For example, Japanese Unexamined Patent Publication (JP-A) No. 252093/1993 discloses an intermittent reception system for a mobile communication apparatus. In the disclosed system, an intermittent reception cycle is set in an interval timer to be equal to a predetermined fixed value after the broadcasting signal from the base station has been securely subjected to a reception process for the first time by carrying out continuous reception of the broadcasting signal. Thereafter, the broadcasting signal is subjected to the reception process at every predetermined intermittent reception cycle thus determined. When the broadcasting signal from the base station can not be accurately subjected to the reception process in this event, the continuous reception is again performed so that the broadcasting signal from the base station is securely subjected to the reception process. It is noted here that the broadcasting signal from the base station can not be accurately subjected to the reception process mainly because the above-mentioned intermittent reception cycle is varied in compliance with temperature variation of an oscillation frequency of a low-frequency quartz oscillator for producing a clock pulse sequence counted by the interval timer.

In the above-mentioned conventional intermittent reception system, the continuous reception is performed again in case where the broadcasting signal from the base station can not be accurately subjected to the reception process, as described in the foregoing. Therefore, even during the standby period for call reception or call origination (transmission), the battery as a power supply of the mobile communication apparatus is exhausted at a greater ratio. This results in a disadvantage that a communicable time is shortened.

SUMMARY OF THE INVENTION

It is therefore an object of this invention to provide a mobile communication apparatus which can compensate for variation of intermittent reception cycle due to variation of an environment temperature of the apparatus.

It is another object of this invention to provide a mobile communication apparatus of the type described, which is capable of extending a communication time thereof by saving consumption of a power battery.

A mobile communication apparatus to which this invention is applicable is for intermittently receiving a broadcasting signal at a reception timing which appears by a predetermined intermittent reception cycle. The apparatus includes a clock generator for generating a clock signal which is used in determining the reception timing and which has a clock frequency liable to vary due to an environment temperature of the apparatus.

According to this invention, the apparatus comprises: a maximum count determining section connected to the clock generator for determining a maximum count by multiplying the predetermined intermittent reception cycle by the clock frequency of the clock generator at a particular time instant; a reception timing determining section having an initial count equal to zero and given the maximum count at the particular time instant for repeatedly carrying out a counting operation of counting up the initial count to an increased count in response to the clock signal generated by the clock generator to produce, when the increased count is equal to the maximum count, a coincidence signal specifying the reception timing; and a temperature monitoring section for measuring the environment temperature at the particular time instant as a measured temperature to determine a monitor temperature zone corresponding to the measured temperature and for monitoring, as a subsequent measured temperature, the environment temperature after the particular time Instant to judge whether or not the subsequent measured temperature is out of the monitor temperature zone to produce a reception timing correction instruction signal when the subsequent measured temperature is out of the monitor temperature zone. The maximum count determining section is also connected to the temperature monitoring section for determining a corrected maximum count by multiplying the predetermined intermittent reception cycle by the clock frequency of the clock generator at a correction time instant when the temperature monitoring section produces the reception timing correction instruction signal. The reception timing determining section is given the corrected maximum count at the correction time instant for repeatedly carrying out the counting operation of counting up the initial count to the increased count in response to the clock signal generated by the clock generator to produce the coincidence signal when the increased count is equal to the corrected maximum count. The temperature monitoring section is furthermore for measuring the environment temperature at the correction time instant as a different measured temperature to determine a different monitor temperature zone corresponding to the different measured temperature and for monitoring, as a different subsequent measured temperature, the environment temperature after the different time instant to judge whether or not the different subsequent measured temperature is out of the different monitor temperature zone to produce the reception timing correction instruction signal when the different subsequent measured temperature is out of the different monitor temperature zone.

DESCRIPTION OF THE PREFERRED EMBODIMENT

Description will be made as regards an embodiment of this invention.

Figure 1:
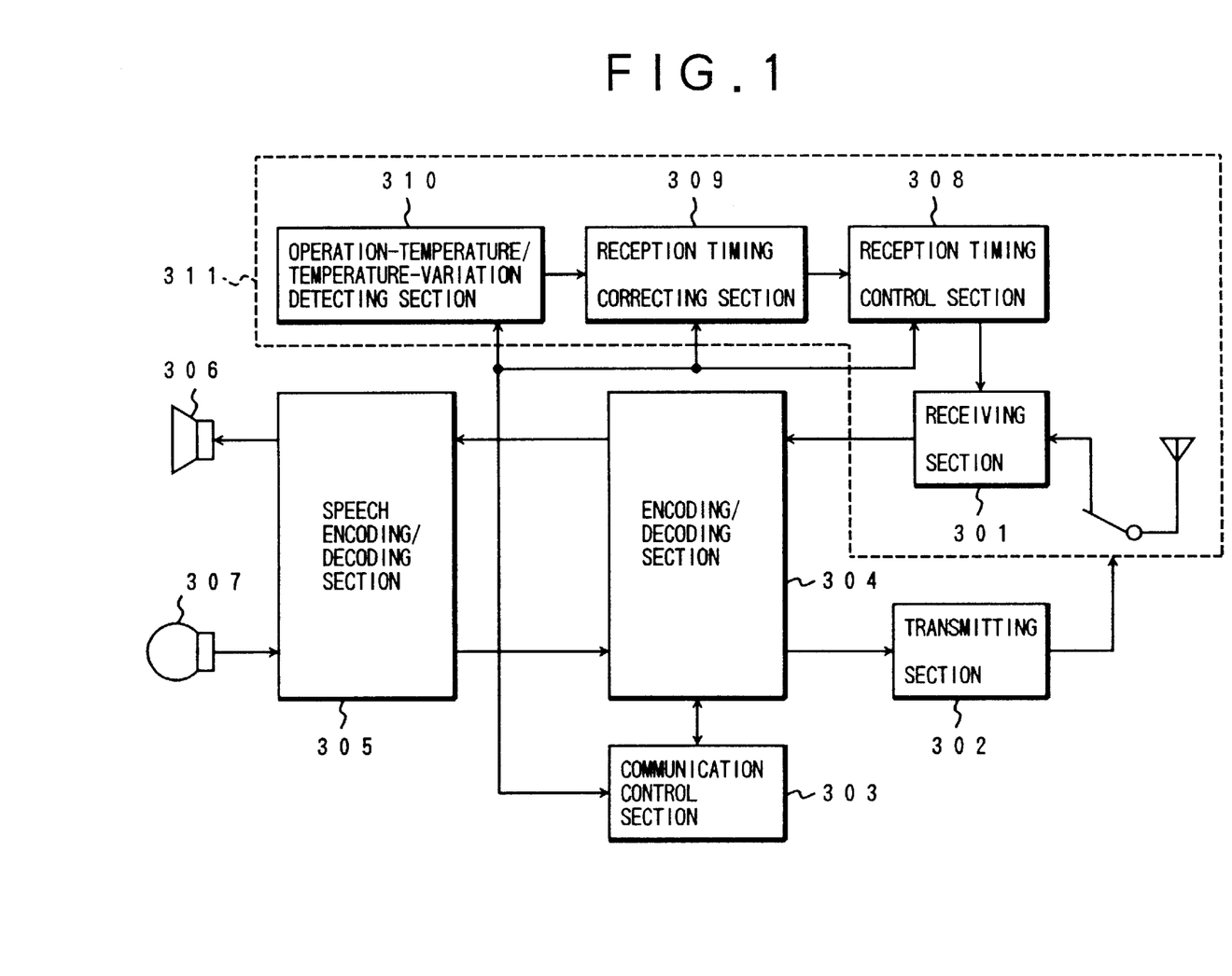
FIG. 1 is a block diagram of a mobile communication apparatus according to an embodiment of this invention.

FIG. 1 is a block diagram of a structure of a mobile communication apparatus according to an embodiment of this invention. In the block diagram, a portion depicted at 311 is related to an intermittent reception system of this invention and comprises an operation-temperature/temperature-variation detecting section 310, a reception timing correcting section 309, a reception timing control section 308, and a receiving section 301. Reference numerals 302 to 307 will later be described.

Figure 2:
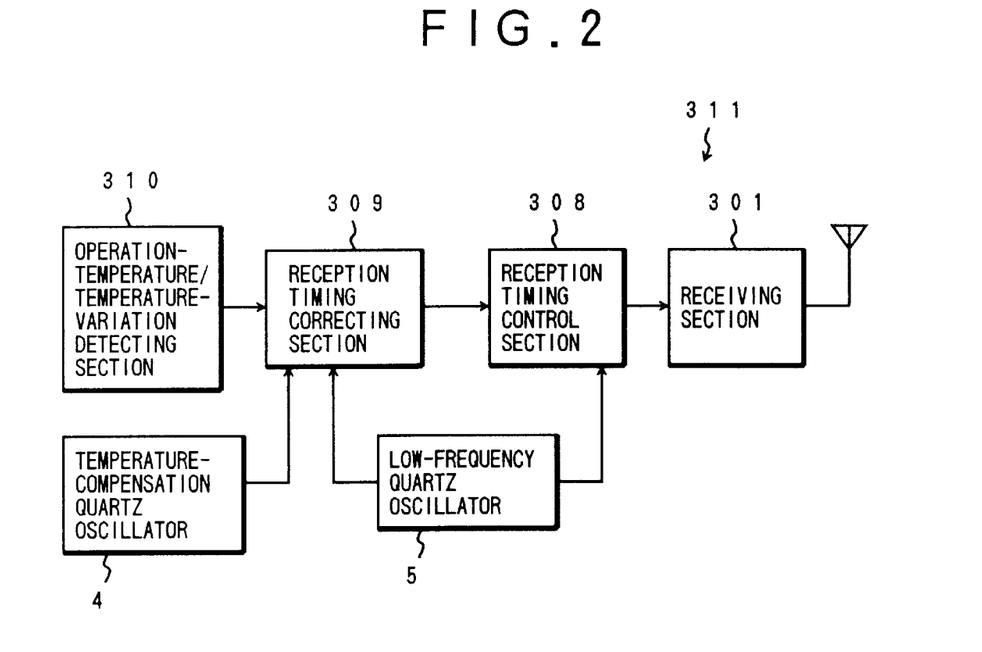
FIG. 2 is a block diagram of details of a portion 311 of the mobile communication apparatus illustrated in of FIG. 1.

FIG. 2 is a block diagram showing the structure of the portion 311 in FIG. 1 more in detail. The portion 311 comprises a temperature-compensation quartz oscillator 4 and a low-frequency quartz oscillator 5 in addition to the operation-temperature/temperature-variation detecting section 310, the reception timing correcting section 309, the reception timing control section 308, the receiving section 301.

Figure 3:
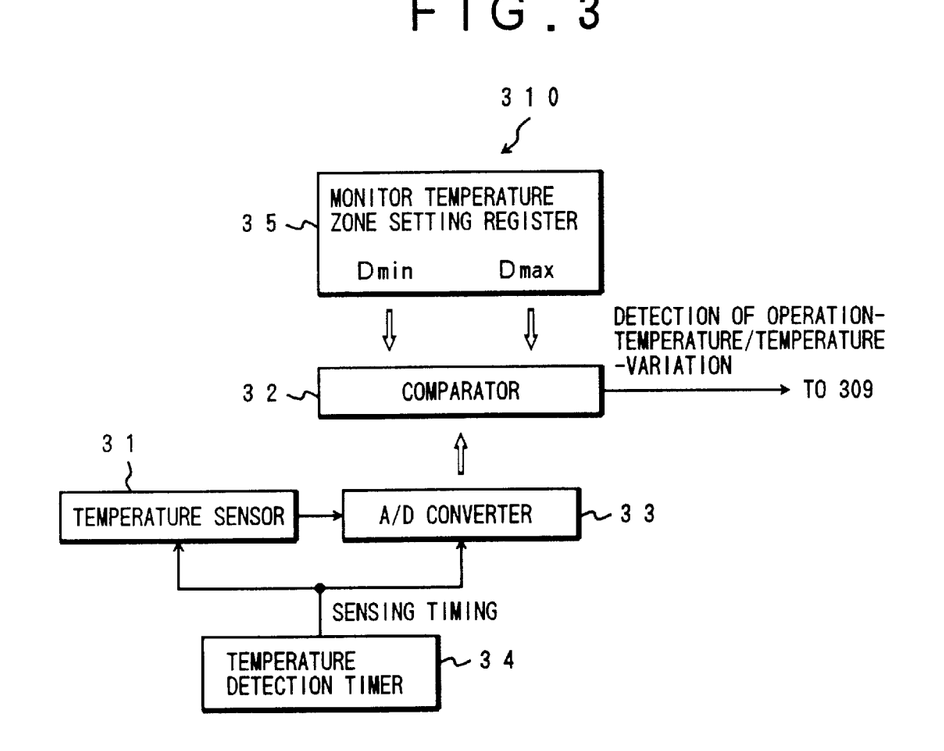
FIG. 3 is a block diagram of details of an operation-temperature/temperature-variation detecting section 310 of FIG. 2.

FIG. 3 is a block diagram showing the structure of the operation-temperature/temperature-variation detecting section 310 of FIG. 2. The operation-temperature/temperature-variationdetecting section 310 comprises a temperature sensor 31, a comparator 32, an A/D (analog-to-digital) converter 33, a temperature detection timer 34, and a monitor temperature zone setting register 35.

Figure 4:
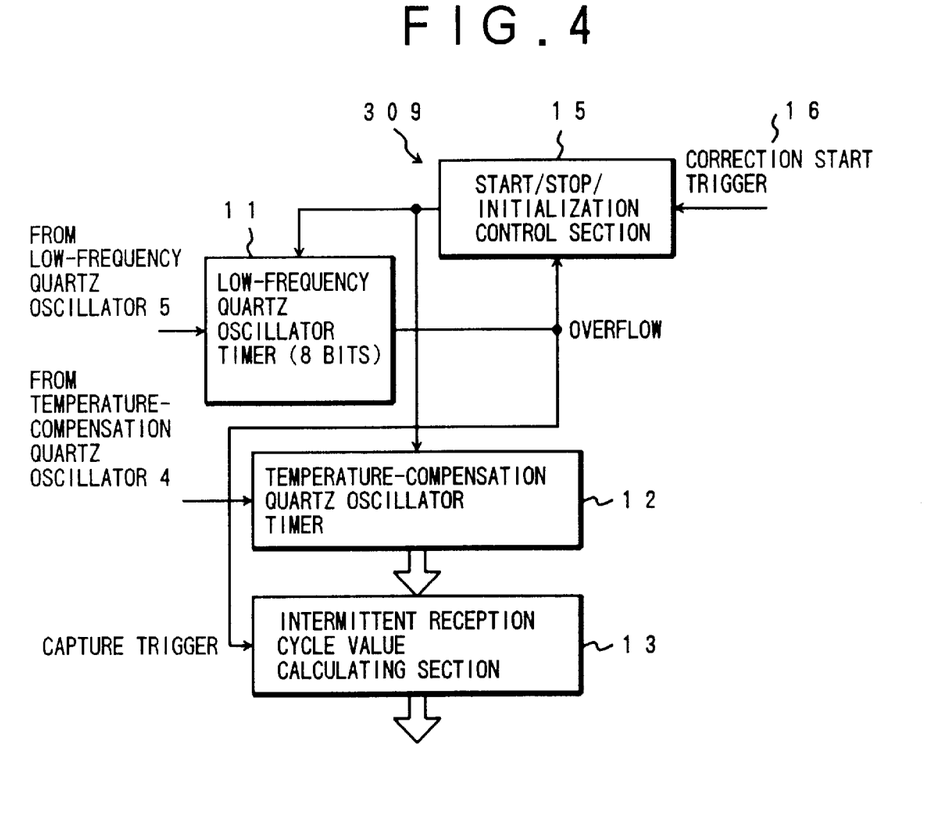
FIG. 4 is a block diagram of details of a reception timing correcting section 309 of FIG. 2.

FIG. 4 is a block diagram showing the structure of the reception timing correcting section 309 of FIG. 2. The reception timing correcting section 309 comprises a low-frequency quarts oscillator timer 11, a temperature-compensation quartz oscillator timer 12, an intermittent reception cycle value calculating section 13, and a start/stop/initialization controlling section 15 supplied with a correction start trigger 16.

Figure 5:
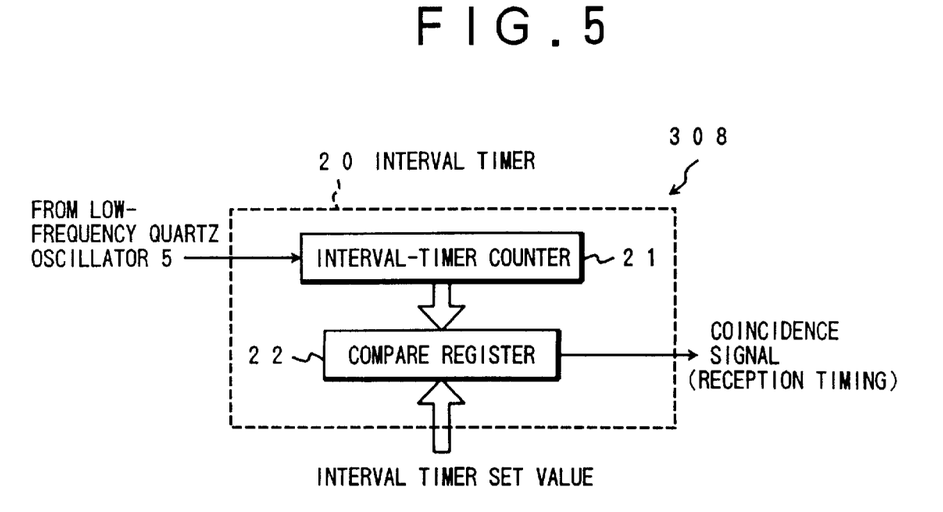
FIG. 5 is a block diagram of details of a reception timing control section 308 of FIG. 2.

FIG. 5 is a block diagram showing the structure of the reception timing control section 308 of FIG. 2.

Figure 6:
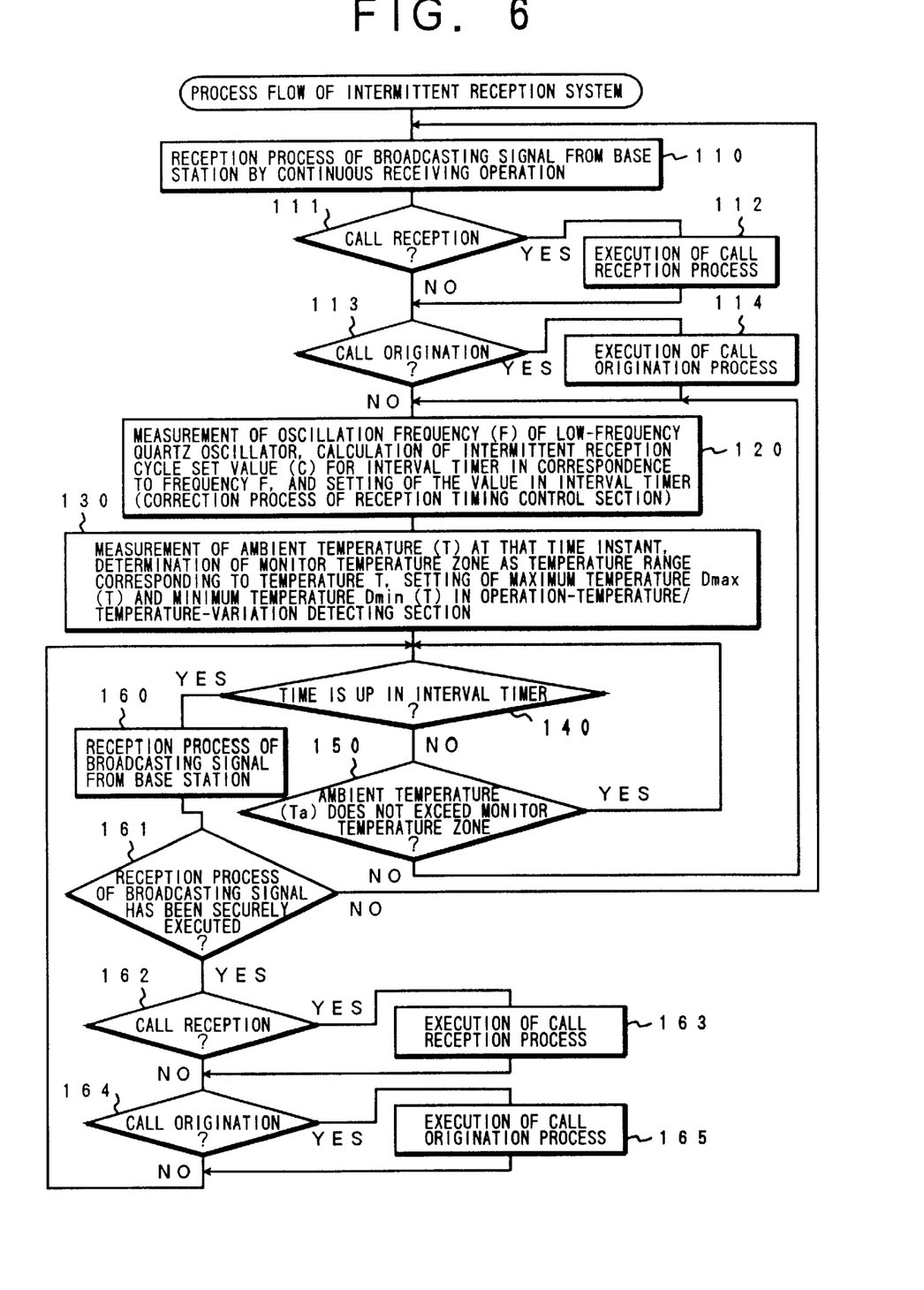
FIG. 6 is a flow chart for use in describing an operation of FIG. 2.

FIG. 6 is a flow chart showing an operation of FIG. 2. At first, a broadcasting signal from a base station is continuously received and securely subjected to a reception process (step 110). Thereafter, call reception or call origination (transmission) is confirmed and, upon presence of the call reception or the call origination (transmission), a call reception process or a call origination process is executed (steps 111 to 114). Subsequently, an oscillation frequency (F) of the low-frequency quartz oscillator 5 (FIG. 2)is measured as a measured value. From the measured value, calculation is made of a count value required in counting a predetermined intermittent reception cycle by an interval-timer counter 21 (FIG. 5) of the reception timing control section 308 (FIG. 2) using a clock signal (a clock pulse sequence) of the low-frequency quartz oscillator 5 as a counting clock. The count value is set in a compare register 22 (FIG. 5) as a count set value. In this manner, a correction process of the reception timing control section 308 is executed (step 120).

A temperature variation range is preliminarily divided into a plurality of temperature zones. Then, the temperature at the time instant of execution of the above-mentioned correction process is measured as a measured temperature. One of the temperature zones corresponding to the measured temperature is selected as a temperature-variation monitor temperature zone to monitor in the operation-temperature/temperature-variation detecting section 310 (FIG. 2) the temperature after that time instant (step 130).

Subsequently, confirmation is made about whether or not time is up in the interval-timer counter 21 (step 140). That is, confirmation is made about whether or not time-out occurs in the interval-timer counter 21 at the step 140. If time is not up, judgement is made about whether or not the temperature until that time instant exceeds the monitor temperature zone (step 150). If the temperature does not exceed the monitor temperature zone, the operation returns to the step 140 with the correction process (step 120) of the reception timing control section 308 omitted. If the temperature exceeds the monitor temperature zone, the correction process (step 120) of the reception timing control section 308 is executed. On the other hand, if time is up in the interval-timer counter 21, the broadcasting signal from the base station is subjected to the reception process (step 160). Judgement is then made about whether or not the reception process of the broadcasting signal has been securely executed (step 160 [1611]). If the reception process of the broadcasting signal has not securely been executed, the operation returns to the continuous reception process at an initial stage (step 110). If the reception process has been securely executed, the call reception process or the call origination process are executed (steps 162 through 165). Thereafter, the operation returns to the confirmation (step 140) for a subsequent time up (or a subsequent time-out) in the interval-timer counter 21.

It is noted here that the temperature zone determined in the step 130 is preliminarily calculated from a temperature characteristic of the oscillation frequency of the low-frequency quartz oscillator 5.

Figure 7:
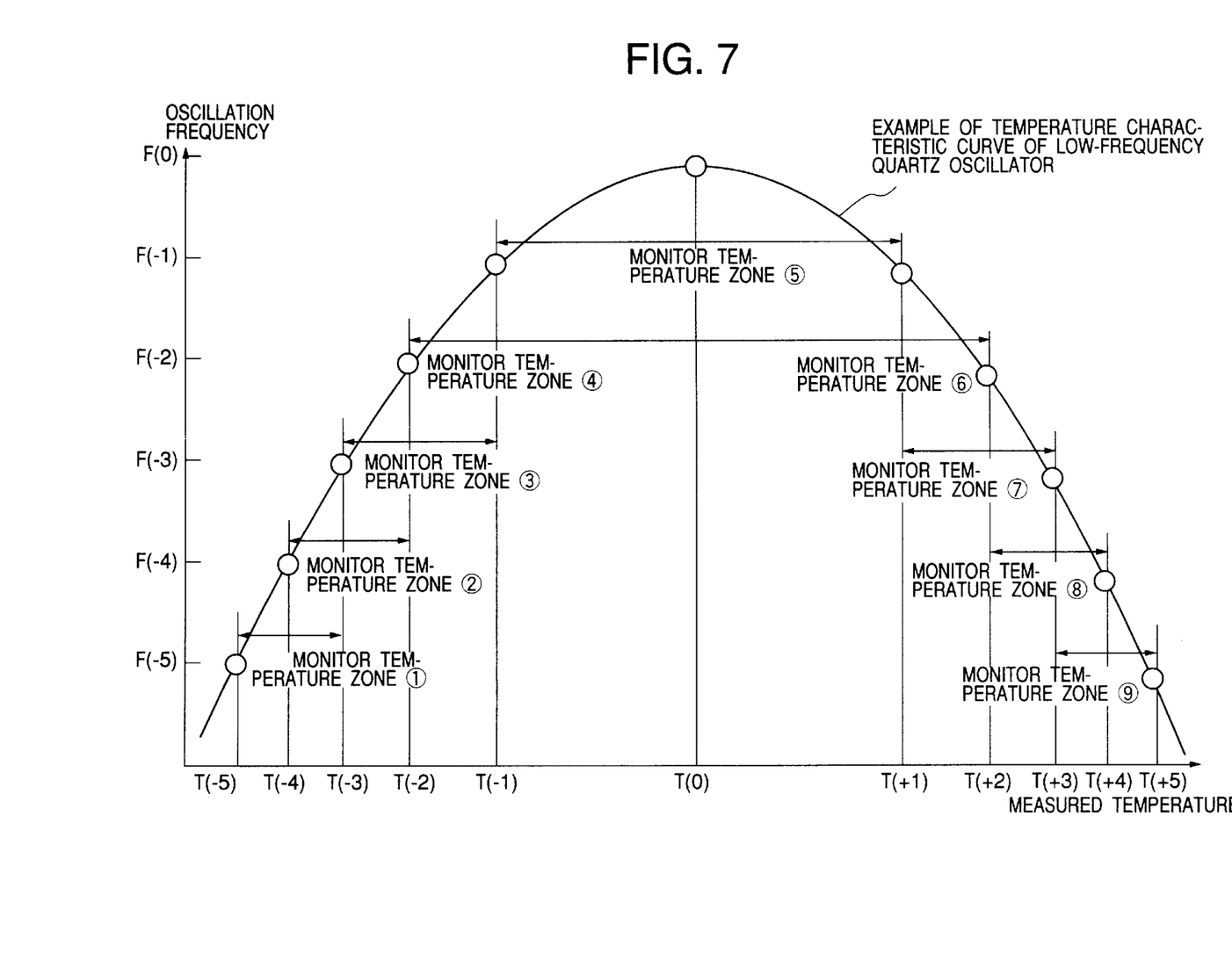
FIG. 7 is a view of monitor temperature zones which view is for use in describing the operation of FIG. 6.

For example, FIG. 7 shows an example of a temperature characteristic curve of the oscillation frequency of the clock signal of the low-frequency quartz oscillator 5 and represents a quadratic curve (a curve of the second-order) having a maximum value which is an oscillation frequency F(0) at a temperature T(0) around a room temperature. The count value set in the reception timing control section 308 is selected to be equal to a value C(0) satisfying the relationship represented by:

$$C(0)=[C-1]+1,$$

$$C*(1/F(0))=tcy$$

at the temperature T(0). Herein, a symbol * represents a multiplication sign, [ ], a Gaussian symbol, tcy, the intermittent reception cycle of a fixed value.

For simplicity of the description, it is assumed here that the relationship $CO*(1/F(0))=tcy$ is satisfied. Let $F(-1)$ represent the frequency of the clock signal for which the count value $C(0)-1$ must be set in the reception timing control section 308. In this event, the relationship $F(-1)=F(0)-(1/C(O))*F(0)$ is satisfied. Likewise, let $F(-n)$ represent the frequency of the clock signal for which the count value $C(0)-n$ must be set in the reception timing control section 308. In this event, the relationship $F(-n)=F(0)-n*(1/C(0))*F(0)$ is satisfied.

Within an operation guaranteed range, the oscillation frequency of the clock signal of the low-frequency quartz oscillator 5 exhibits the temperature variation within a range on the order of −100 ppm with respect to F(0) as a reference value. Assuming that C(0) is not greater than 40000, the relationship (1/C(O))*1000000>25 ppm is given. Therefore, the operation guaranteed temperature range can be divided by the temperatures T(−1), T(+1), T(−2), T(+2), T(−3), T(+3), T(−4), T(+4), T(−5), and T(+5) at which the oscillation frequency of the clock signal is equal to F(−1), F(−2), F(−3), F(−4), and P(−5). Thus, measured temperature zones are provided.

Figure 8:
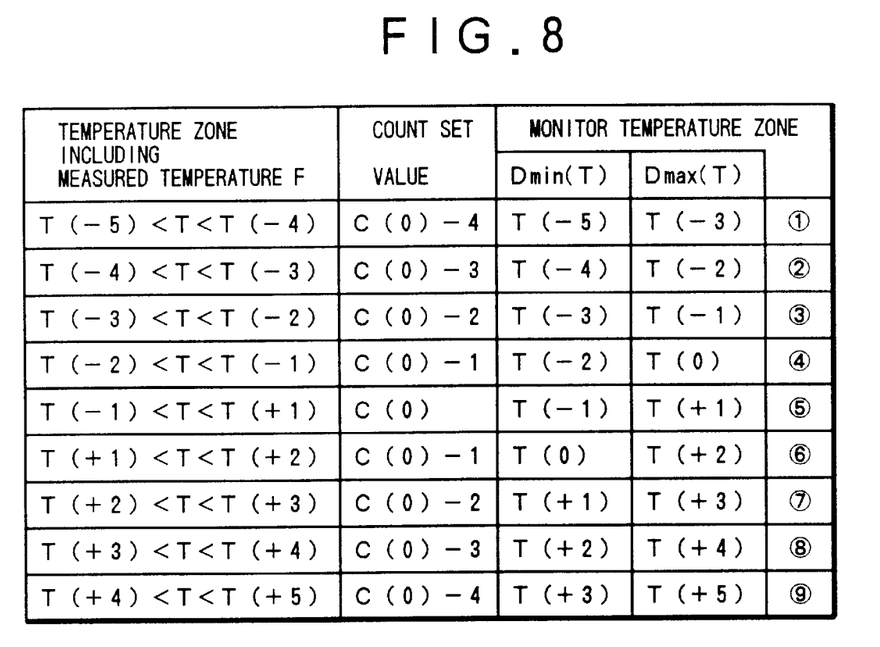
FIG. 8 Is a view of a relationship among a measurement temperature, a count set value, and a monitor temperature zone which view is for use in describing the operation of FIG. 6.

Herein, a particular one of the measured temperature zones which includes the measured temperature, the count set value set in the reception timing control section 308 at that time, and the monitor temperature zone determined in correspondence to the measured temperature have a relationship illustrated in FIG. 8. In the above-mentioned manner, the measured temperature zones and the monitor temperature zones can preliminarily be determined.

Figure 9:
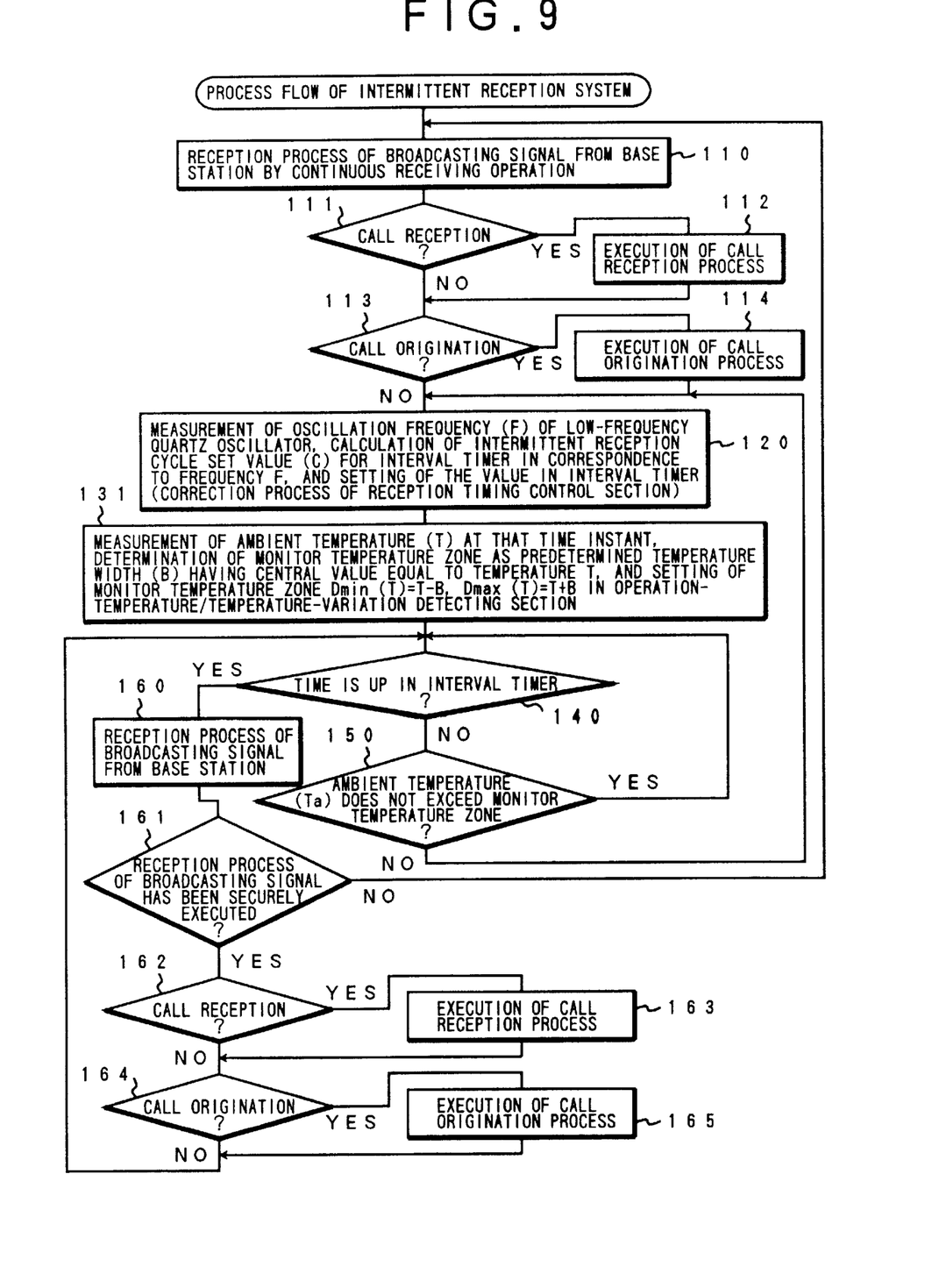
FIG. 9 is a flow chart for use in describing another operation of FIG. 2.

FIG. 9 is a flow chart showing another operation of FIG. 2. The difference of operation of FIG. 9 from the operation in FIG. 6 is that a step 131 is carried out in FIG. 9 instead of the step 130. In FIG. 9, the step 130 is modified so that a predetermined temperature width B having a central value equal to the temperature measured at that time instant is selected as a monitor temperature zone to monitor the temperature thereafter (step 131).

It is noted here that the temperature width B determined in the step 131 is preliminarily calculated from a temperature characteristic of the oscillation frequency of the low-frequency quartz oscillator 5.

Turning back to FIGS. 1 through 4, description will be made as regards the mobile communication apparatus according to the embodiment of this invention more in detail.

FIG. 1 shows an example of the mobile communication apparatus based on the second-generation cordless telephone system standard RCR STD-28 (hereinafter simply referred to as STD-28). The mobile communication apparatus illustrated in FIG. 1 comprises a receiving section 301 for demodulating a reception radio wave, a transmitting section 302 for transmitting modulated data as a transmission radio wave, an encoding/decoding section 304 for processing demodulated reception data to produce a speech sound or control information in accordance with STD-28 and for converting the speech sound or the control information into transmission data to be delivered to the transmitting section 302, a communication control section 303 for delivering and receiving the control information through the encoding/decoding section 304 to control the communication, a speech encoding/decoding section 305 for delivering and receiving speech data through the encoding/decoding section 304 to realize speech communication, a loudspeaker 306, a microphone 307, the reception timing control section 308 for driving the receiving section 301, the reception timing correcting section 309 for correcting reception timing produced by the reception timing control section 308, and an operation-temperature/temperature-variation detecting section 310 for monitoring an ambient temperature around a low-frequency quartz oscillator and activating the reception timing correcting section upon detection of the temperature variation. The portion (311) surrounded by a dashed line is a portion realizing the intermittent reception system of this invention.

In the mobile communication apparatus illustrated in FIG. 1, the receiving section 301 is driven at the timing produced by the reception timing control section 308 controlled by the communication control section 303. The reception radio wave is demodulated by the receiving section 301 and decoded by the encoding/decoding section 304. It is noted here that the reception timing for each bit can not be controlled by the reception timing control section 308 but is corrected in the following manner. Specifically, the encoding/decoding section 304 monitors the position of a fixed value region (unique word) in the reception data during normal reception. The correction is executed in correspondence to the offset of the position. In the data demodulated by the receiving section 301, control data and communication data are delivered to the communication control section 303 and the speech encoding/decoding section 305, respectively. The communication control section 303 carries out communication control while the speech encoding/decoding section 305 decodes the data to be delivered to the loudspeaker 306 as the speech sound.

On the other hand, a reception speech sound received through the microphone 307 is speech-encoded by the speech encoding/decoding section 305 and delivered to the encoding/decoding section 304. Control data produced by the communication control section 303 are delivered to the encoding/decoding section 304. The encoding/decoding section 304 encodes the both data into encoded data for transmission and delivers the encoded data to the transmitting section 302. The transmitting section 302 modulates the encoded data into the radio wave to be transmitted.

The operation-temperature/temperature-variation detecting section 301 monitors the temperature around the low-frequency quartz oscillator 5 (FIG. 2) which is used in production of the reception timing and as a system subclock. When the temperature exceeds the monitor temperature zone set by the communication control section 303, the reception timing correcting section 309 is activated. The reception timing correcting section 309 corrects the reception timing taking into account the temperature error of the low-frequency quartz oscillator.

FIG. 2 shows the portion 311 of FIG. 1. The portion 311 comprises the receiving section 301 for demodulating the reception radio wave, the reception timing control section 308 for producing an intermittent reception timing of the receiving section 301 during a call reception standby state, the reception timing correcting section 309 for correcting the reception timing upon occurrence of a reception timing error, the temperature-compensation quartz oscillator 4 (frequency F0) for producing an operation clock upon high-speed operation, the low-frequency quartz oscillator 5 (frequency F1) for producing the operation clock upon low-speed operation, for example, during a reception stop period in the intermittent operation as well as a driving cycle for driving the reception timing control section 308, and the operation-temperature/temperature-variation detecting section 310 for monitoring and notifying an operation temperature of the system and the temperature variation.

In the illustrated example, the reception process is executed by driving the receiving section 301 in an intermittent reception cycle (for example, at every 1.2 second) produced by the reception timing control section 308 driven by the low-frequency quartz oscillator 5. Thus, the intermittent receiving operation is realized. When the temperature variation is notified by the operation-temperature/temperature-variation detecting section 310 during the intermittent receiving operation in the intermittent reception cycle produced by the reception timing control section 308, the reception timing correcting section 309 corrects the cycle of the reception timing with reference to the temperature error of the low-frequency quartz oscillator 5 measured by the temperature-compensation quartz oscillator 4.

As illustrated in FIG. 3, the operation-temperature/ temperature-variation detecting section 310 comprises the temperature sensor 31 for converting the operation temperature into an analog signal, the A/D converter 33 for converting the analog signal into a digital value, the comparator 32 for detecting whether or not the value of the A/D converter 33 exceeds the monitor temperature zone, and the temperature detection timer 34 for producing an appropriate cycle for detection of the operation temperature and the temperature variation. Upon detection of the temperature variation, it is notified to the reception timing correcting section 309.

As illustrated in FIG. 4, the reception timing correcting section 309 comprises the low-frequency quartz oscillator timer 11 driven by the low-frequency quartz oscillator 5, the temperature-compensation quartz oscillator timer 12 driven by the temperature-compensation quartz oscillator 4, the intermittent reception cycle value calculating section 13 for calculating an intermittent cycle value to be set in the compare register in the reception timing control section taking into account the error of the low-frequency quartz oscillator 5 with reference to the value of the temperature-compensation quartz oscillator timer 12 upon occurrence of overflow of the low-frequency quartz oscillator timer 11, and the start/stop/initialization control section 15 for starting and stopping a counting operation of each timer and for resetting the count. value into zero.

Figure 10:
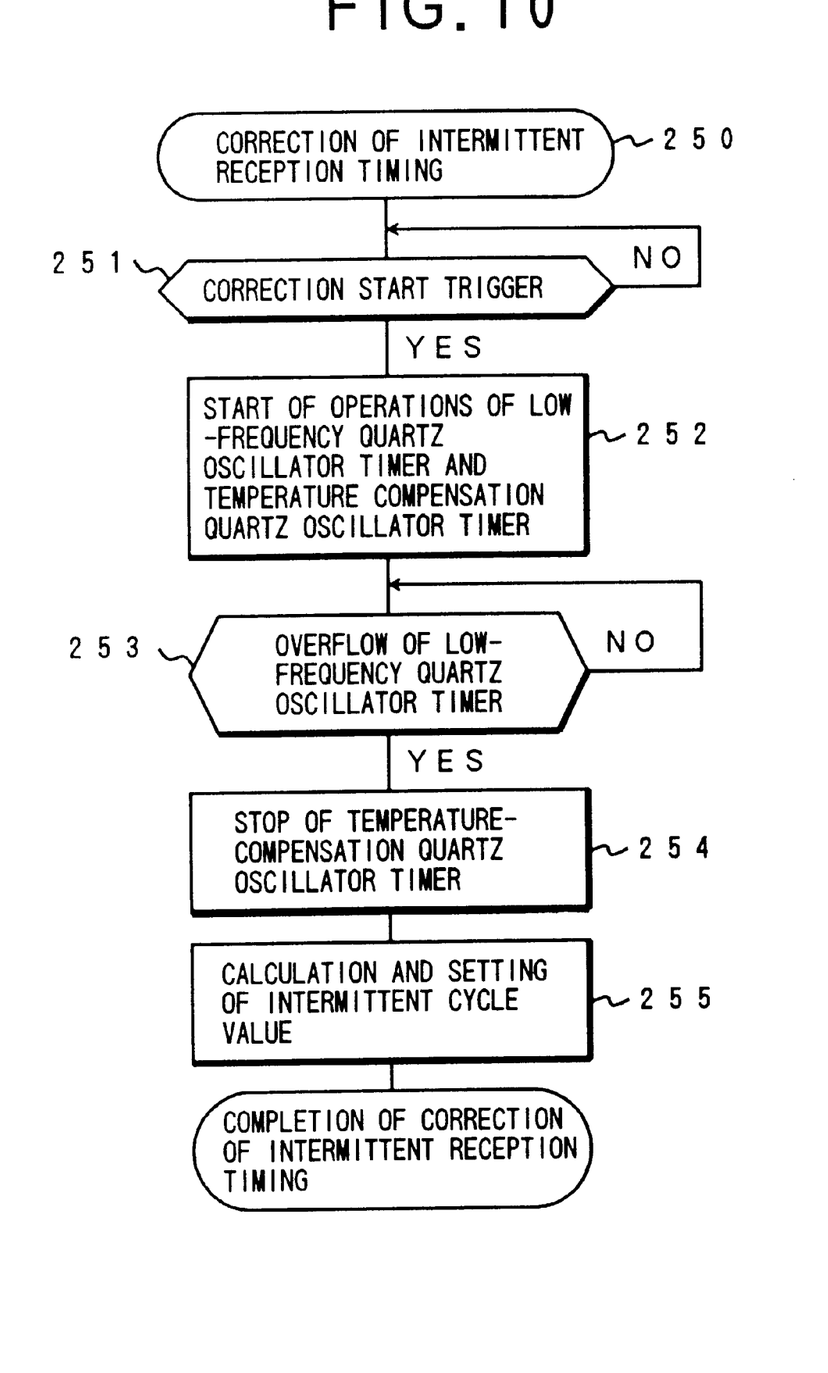
FIG. 10 is a flow chart for use in describing operation of the reception timing correcting section 309 of FIG. 4.

FIG. 10 is a flow chart for describing an example of a procedure (250) of the reception timing correcting section 309 of FIG. 4. When the correction start trigger 16 for starting the reception timing correcting operation is received from the operation-temperature/temperature-variation detecting section 6 (251). the low-frequency quartz oscillator timer 11 and the temperature-compensation quartz oscillator timer 12 are simultaneously put in operation (252). When the low-frequency quartz oscillator timer 11 overflows (maximum value C0=255) (253), the temperature-compensation quartz oscillator timer 12 is stopped (254). From the value (C1) of the temperature-compensation quartz oscillator timer 12, the intermittent reception cycle value (C2) to be set in the reception timing control section 308 is calculated (for example, when the intermittent reception cycle is 1.2 second, C2=1.2 sec. ×C0×F1/C1), taking into account the error of the low-frequency quartz oscillator 5 and is set in the reception timing control section 308 (255).

Figure 11:
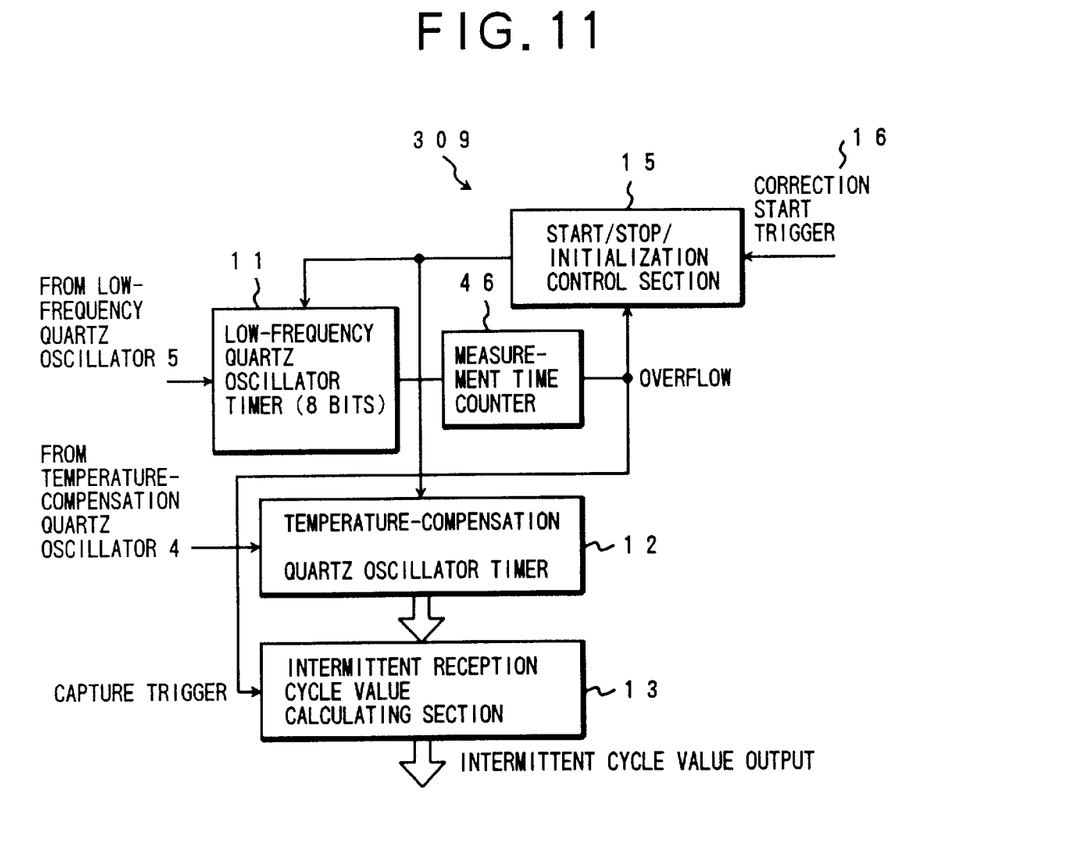
FIG. 11 is a block diagram of details of another reception timing correcting section 309 of FIG. 2.

FIG. 11 shows another reception timing correcting section 309. The reception timing correcting section 309 is similar in structure to that of FIG. 4 but can increase the accuracy in reception timing correcting operation to decrease the number of times of occurrence of out-of-synchronization due to a correction error.

For this purpose, the reception timing correcting section 309 of FIG. 11 comprises a low-frequency quartz oscillator timer 11 driven by the low-frequency quartz oscillator 5, a temperature-compensation quartz oscillator timer 12 driven by the temperature-compensation quartz oscillator 4, a measurement time counter 46 for counting the number of times of overflow of the low-frequency quartz oscillator timer 11, an intermittent cycle value calculating section 13 for calculating an intermittent cycle value to be set in the reception timing control section, taking into account the error of the low-frequency quartz oscillator 5 with reference to the value of the temperature-compensation quartz oscillator timer 12 upon occurrence of overflow of the measurement time counter 46, and a start/stop/initialization control section 15 for controlling the operation of each timer.

Figure 12:
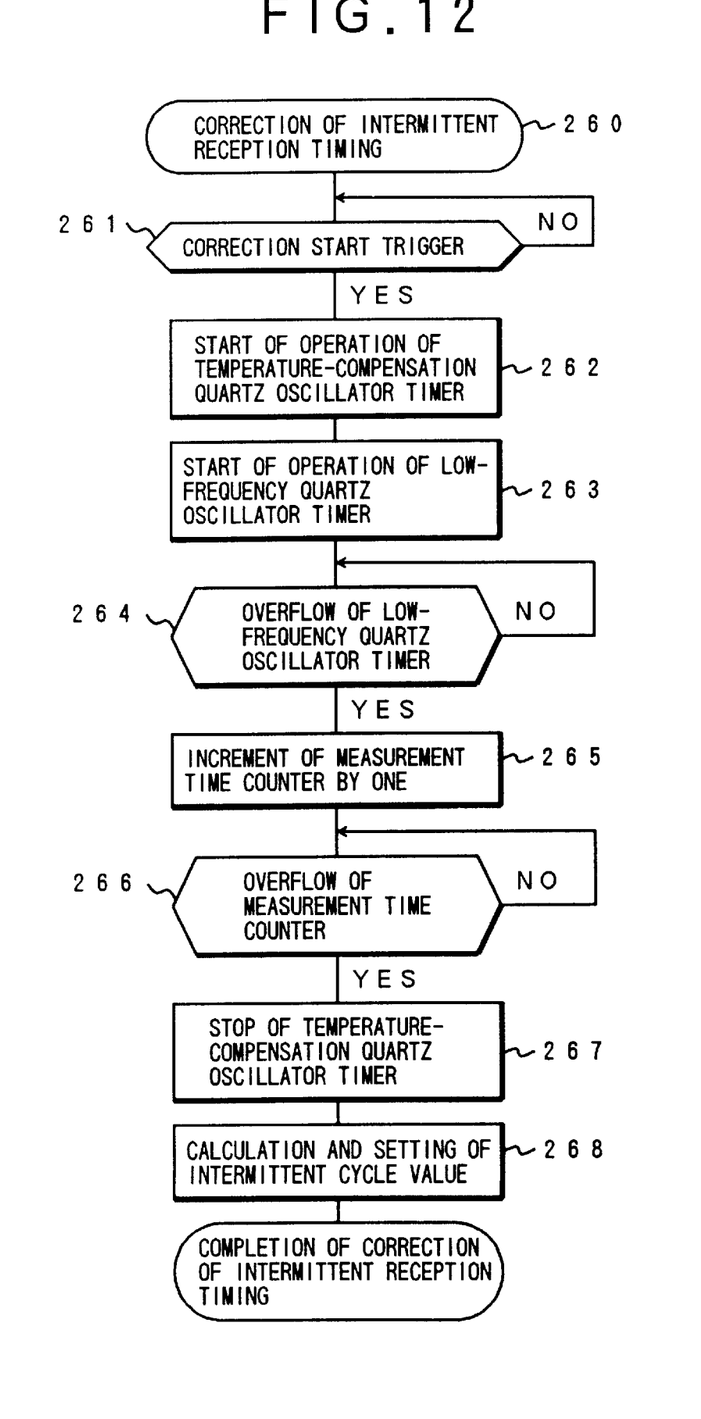
FIG. 12 is a flow chart for use in describing operation of the reception timing correcting section 309 of FIG. 11.

FIG. 12 is a flow chart for describing an example of a procedure (260) of the reception timing correcting section 309 of FIG. 11. When a correction start trigger 16 for starting the reception timing correcting operation is received from the operation-temperature/temperature-variation detecting section 310 (261), the temperature-compensation quartz oscillator timer 12 is put in operation (262) and the low-frequency quartz oscillator timer 11 is also put in operation (263). When the low-frequency quartz oscillator timer 11 overflows (maximum value C0=255) (264), the measurement time counter 46 (maximum value Cnt) is incremented by one (265). The low-frequency quartz oscillator timer 11 is operated until the measurement time counter 46 overflows (266). When the measurement time counter 46 overflows, the temperature-compensation quartz oscillator timer 12 is stopped (267). From the value (C1) of the temperature-compensation quartz oscillator timer 12, the intermittent reception cycle value (C2) to be set in the reception timing control section 308 is calculated (for example, C2=1.2 sec.×C0×Cnt×F1/C2), taking into account the error of the low-frequency quartz oscillator 5 and is set in the reception timing control section 308 (268).

In the illustrated example, a measurement time for the error of the low-frequency quartz oscillator 5 is extended so that the accuracy in the result of error measurement is increased. Therefore, the likelihood of occurrence of out-of-synchronization due to the error of the low-frequency quartz oscillator 5 is further reduced. As a result, it is possible to provide a mobile communication terminal high in reliability of call reception and low in power consumption.

As illustrated in FIG. 5, the reception timing control section 308 comprises an interval timer 20. The interval timer 20 comprises a compare register 22 for determining the reception timing, and an interval-timer counter 21 driven by the low-frequency quartz oscillator for counting up to the value coincident with the intermittent reception cycle value (the value of the compare register 22) to produce the reception timing. When the temperature variation is detected by the operation-temperature/temperature-variation detecting section 310, a corrected new intermittent reception cycle value is calculated by the reception timing correcting section 309 and set in the compare register 22. Thus, the intermittent receiving operation is continuously executed with a less possibility of out-of-synchronization with respect to the base station.

As described above, it is possible according to the intermittent reception system for the mobile communication apparatus of this invention to efficiently correct, by preliminarily determining the monitor temperature zone, the offset of the intermittent reception cycle due to the temperature variation of the frequency of the counting clock signal of the reception timing control section, which is a main factor of the reception offset of the broadcasting signal. This saves consumption of the power supply battery and extends the communicable time. summarizing in FIGS. 2–5 and 11, the mobile communication apparatus is for intermittently receiving a broadcasting signal at a reception timing which appears by a predetermined intermittent reception cycle. The apparatus includes a clock generator (5) for generating a clock signal which is used in determining the reception timing and which has a clock frequency liable to vary due to an environment temperature of the apparatus.

The apparatus comprises a maximum count determining section (309) connected to the clock generator (5) for determining a maximum count by multiplying the predetermined intermittent reception cycle by the clock frequency of the clock generator (5) at a particular time instant.

A reception timing determining section (308) has an initial count equal to zero and given the maximum count at the particular time instant for repeatedly carrying out a counting operation of counting up the initial count to an increased count in response to the clock signal generated by the clock generator (5) to produce, when the increased count is equal to the maximum count, a coincidence signal specifying the reception timing.

A temperature monitoring section (310) is for measuring the environment temperature at the particular time instant as a measured temperature to determine a monitor temperature zone corresponding to the measured temperature and for monitoring, as a subsequent measured temperature, the environment temperature after the particular time instant to judge whether or not the subsequent measured temperature is out of the monitor temperature zone to produce a reception timing correction instruction signal when the subsequent measured temperature is out of the monitor temperature zone.

The maximum count determining section (309) is also connected to the temperature monitoring section (310) for determining a corrected maximum count by multiplying the predetermined intermittent reception cycle by the clock frequency of the clock generator (5) at a correction time instant when the temperature monitoring section (310) produces the reception timing correction instruction signal.

The reception timing determining section (308) is given the corrected maximum count at the correction time instant for repeatedly carrying out the counting operation of counting up the initial count to the increased count in response to the clock signal generated by the clock generator (5) to produce the coincidence signal when the increased count is equal to the corrected maximum count.

The temperature monitoring section (310) is furthermore for measuring the environment temperature at the correction time instant as a different measured temperature to determine a different monitor temperature zone corresponding to the different measured temperature and for monitoring, as a different subsequent measured temperature, the environment temperature after the different time instant to Judge whether or not the different subsequent measured temperature is out of the different monitor temperature zone to produce the reception timing correction instruction signal when the different subsequent measured temperature is out of the different monitor temperature zone.

The maximum count determining section (309) comprises: a frequency measuring section (11, 12) connected to the clock generator (5) for measuring the clock frequency as a measured frequency at each of the particular time instant and the correction time instant; and a calculating section (13) connected to the frequency measuring section (11, 12) for calculating each of the maximum count and the corrected maximum count by multiplying the predetermined intermittent reception cycle by the clock frequency of the clock generator (5) at each of the particular time instant and the correction time instant.

The clock generator (5) may be a low-frequency quartz oscillator for generating the clock signal of a low frequency.

The apparatus further comprises a temperature-compensation high-frequency quartz oscillator (4) for generating a temperature-compensation clock signal of a high frequency which is higher than the low frequency of the low-frequency quartz oscillator.

The frequency measuring section (11, 12) Is also connected to the temperature-compensation high-frequency quartz oscillator (4) for measuring the clock frequency as the measured frequency at each of the particular time instant and the correction time instant with reference to the temperature-compensation clock signal of the high frequency. The temperature monitoring section (310) determines each of the monitor temperature zone and the different monitor temperature zone by preliminarily dividing a temperature variation range into a plurality of temperature zones and by selecting one of the plurality of temperature zones to which each of the measured temperature and the different measured temperature belongs.

Alternatively, the temperature monitoring section (310) determines the monitor temperature zone and the different monitor temperature zone so that the monitor temperature zone has a predetermined temperature width including the measured temperature and that the different monitor temperature zone has the predetermined temperature width including the different measured temperature.

As a further alternative, the temperature monitoring section (310) determines the monitor temperature zone and the different monitor temperature zone so that the monitor temperature zone has a predetermined temperature width including a central value equal to the measured temperature and that the different monitor temperature zone has the predetermined temperature width including another central value equal to the different measured temperature.

The temperature monitoring section (310) monitors each of the subsequent measured temperature and the different subsequent measured temperature by a preselected time interval.

What is claimed is:

1. A mobile communication apparatus for intermittently receiving a broadcasting signal at a reception timing which appears by a predetermined intermittent reception cycle, said apparatus including a clock generator (5) for generating a clock signal which is used in determining said reception timing and which has a clock frequency liable to vary due to an environment temperature of said apparatus, said apparatus comprising:

a maximum count determining section (309) connected to said clock generator for determining a maximum count by multiplying said predetermined intermittent reception cycle by the clock frequency Of said clock generator at a particular time instant;

a reception timing determining section (308) having an initial count equal to zero and given said maximum count at said particular time instant for repeatedly carrying out a counting operation of counting up said initial count to an increased count in response to said clock signal generated by said clock generator to produce, when said increased count is equal to said maximum count, a coincidence signal specifying said reception timing; and a temperature monitoring section (310) for measuring said environment temperature at said particular time instant as a measured temperature to determine a monitor temperature zone corresponding to said measured temperature and for monitoring, as a subsequent measured temperature, said environment temperature after said particular time instant to judge whether or not said subsequent measured temperature is out of said monitor temperature zone to produce a reception timing correction instruction signal when said subsequent measured temperature is out of said monitor temperature zone;

said maximum count determining section being also connected to said temperature monitoring section for determining a corrected maximum count by multiplying said predetermined intermittent reception cycle by the clock frequency of said clock generator at a correction time instant when said temperature monitoring section produces said reception timing correction instruction signal;

said reception timing determining section being given said corrected maximum count at said correction time instant for repeatedly carrying out the counting operation of counting up said initial count to the increased count in response to said clock signal generated by said clock generator to produce said coincidence signal when said increased count is equal to said corrected maximum count;

said temperature monitoring section being furthermore for measuring said environment temperature at said correction time instant as a different measured temperature to determine a different monitor temperature zone corresponding to said different measured temperature and for monitoring, as a different subsequent measured temperature, said environment temperature after said different time instant to judge whether or not said different subsequent measured temperature is out of said different monitor temperature zone to produce said reception timing correction instruction signal when said different subsequent measured temperature is out of said different monitor temperature zone.

2. A mobile communication apparatus as claimed in claim 1, wherein said maximum count determining section comprises:

a frequency measuring section (11, 12) connected to said clock generator for measuring said clock frequency as a measured frequency at each of said particular time instant and said correction time instant;

a calculating section (13) connected to said frequency measuring section for calculating each of said maximum count and said corrected maximum count by multiplying said predetermined intermittent reception cycle by the clock frequency of said clock generator at each of said particular time instant and said correction time instant.

3. A mobile communication apparatus as claimed in claim 2, wherein:

said clock generator is a low-frequency quartz oscillator for generating said clock signal of a low frequency;

said apparatus further comprising a temperature-compensation high-frequency quartz oscillator (4) for generating a temperature-compensation clock signal of a high frequency which is higher than the low frequency of said low-frequency quartz oscillator;

said frequency measuring section being also connected to said temperature-compensation high-frequency quartz oscillator for measuring said clock frequency as said measured frequency at each of said particular time instant and said correction time instant with reference to the temperature-compensation clock signal of said high frequency.

4. A mobile communication apparatus as claimed in claim 1, wherein said temperature monitoring section determines each of said monitor temperature zone and said different monitor temperature zone by preliminarily dividing a temperature variation range into a plurality of temperature zones and by selecting one of said plurality of temperature zones to which each of said measured temperature and said different measured temperature belongs.

5. A mobile communication apparatus as claimed in claim 1, wherein said temperature monitoring section determines said monitor temperature zone and said different monitor temperature zone so that said monitor temperature zone has a predetermined temperature width including said measured temperature and that said different monitor temperature zone has the predetermined temperature width including said different measured temperature.

6. A mobile communication apparatus as claimed in claim 1, wherein said temperature monitoring section determines said monitor temperature zone and said different monitor temperature zone so that said monitor temperature zone has a predetermined temperature width including a central value equal to said measured temperature and that said different monitor temperature zone has the predetermined temperature width including another central value equal to said different measured temperature.

7. A mobile communication apparatus as claimed in claim 1, wherein said temperature monitoring section monitors each of said subsequent measured temperature and said different subsequent measured temperature by a preselected time interval.

* * * * *